United States Patent
Sasaki (10) Patent No.: US 11,902,471 B2
(45) Date of Patent: Feb. 13, 2024

(54) VEHICLE REMOTE ASSISTANCE SYSTEM, REMOTE ASSISTANCE APPARATUS, REMOTE ASSISTANCE METHOD, AND REMOTE ASSISTANCE PROGRAM

(71) Applicant: DENSO CORPORATION, Kariya (JP)

(72) Inventor: Kengo Sasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/656,845

(22) Filed: Mar. 28, 2022

(65) Prior Publication Data

US 2022/0217237 A1 Jul. 7, 2022

Related U.S. Application Data (63) Continuation of application No. PCT/JP2020/030483, filed on Aug. 7, 2020.

(30) Foreign Application Priority Data

Sep. 30, 2019 (JP) ................................. 2019-180417

(51) Int. Cl.
*H04M 3/523* (2006.01)
*G05D 1/00* (2006.01)
*H04M 3/51* (2006.01)

(52) U.S. Cl.
CPC ........ *H04M 3/5238* (2013.01); *G05D 1/0027* (2013.01); *H04M 3/5116* (2013.01); *G05D 2201/0213* (2013.01); *H04M 2203/1016* (2013.01); *H04M 2203/2072* (2013.01)

(58) Field of Classification Search
None
See application file for complete search history.

(56) References Cited

U.S. PATENT DOCUMENTS

| | | | | |
|---|---|---|---|---|
| 5,506,898 | A | * 4/1996 | Costantini | ............. H04M 3/523 379/88.16 |
| 7,630,487 | B2 | * 12/2009 | Shaffer | ............ G06Q 10/06311 379/266.03 |
| 2010/0111288 | A1 | * 5/2010 | Afzal | .................. H04M 3/5232 379/265.14 |
| 2010/0227582 | A1 | * 9/2010 | Berry | .................. H04M 1/6091 455/404.1 |

(Continued)

FOREIGN PATENT DOCUMENTS

| JP | 2011-023892 A | 2/2011 |
|---|---|---|
| JP | 2011-197967 A | 10/2011 |

(Continued)

*Primary Examiner* — Nafiz E Hoque
(74) *Attorney, Agent, or Firm* — MASCHOFF BRENNAN (57) ABSTRACT

A vehicle remote assistance system includes a plurality of vehicles and a remote assistance apparatus. Each of the plurality of vehicles includes a calling unit that transmits a call to the remote assistance apparatus. The remote assistance apparatus includes an assigning unit that schedules the calls that are transmitted from the plurality of vehicles and assigning the calls to any of a plurality of operators. The calling unit transmits a cancelation of the call to the remote assistance apparatus when a reason for the call is resolved after the call is made. The assigning unit cancels scheduling of the call that corresponds to the cancelation that is transmitted from the vehicle.

16 Claims, 8 Drawing Sheets

(56) References Cited

U.S. PATENT DOCUMENTS

| | | | | |
|---|---|---|---|---|
| 2010/0284382 | A1* | 11/2010 | Stahlin | G08G 1/095 |
| | | | | 370/338 |
| 2011/0098016 | A1* | 4/2011 | Hatton | H04M 11/04 |
| | | | | 704/9 |
| 2012/0289185 | A1* | 11/2012 | Leung | H04W 4/44 |
| | | | | 455/404.2 |
| 2017/0187847 | A1* | 6/2017 | Wang | H04W 72/0446 |

FOREIGN PATENT DOCUMENTS

| | | |
|---|---|---|
| JP | 2013-138291 A | 7/2013 |
| JP | 5550671 B2 | 7/2014 |
| JP | 2015-160566 A | 9/2015 |

\* cited by examiner

VEHICLE REMOTE ASSISTANCE SYSTEM, REMOTE ASSISTANCE APPARATUS, REMOTE ASSISTANCE METHOD, AND REMOTE ASSISTANCE PROGRAM

CROSS-REFERENCE TO RELATED APPLICATION

The present application is a continuation application of International Application No. PCT/JP2020/030483, filed on Aug. 7, 2020, which claims priority to Japanese Patent Application No. 2019-180417, filed on Sep. 30, 2019. The contents of these applications are incorporated herein by reference in their entirety.

BACKGROUND

Technical Field

The present disclosure relates to a vehicle remote assistance technology that performs assignment of an operator to a call to provide assistance by an operator when a vehicle calls an operator.

Related Art

A service in which an operator at an assistance center remotely provides assistance to a vehicle when the vehicle requires assistance has been proposed. In this service, for example, regarding an autonomous driving vehicle, in a case in which the vehicle is unable to move based on determination by the vehicle and is stranded, a case in which the vehicle is in an accident, a case in which the vehicle is actively requesting assistance from an operator, and the like, the vehicle makes an operator call to the assistance center.

SUMMARY

One aspect of the present disclosure provides a vehicle remote assistance system that includes a plurality of vehicles and a remote assistance apparatus. Each of the plurality of vehicles includes a calling unit that transmits a call to the remote assistance apparatus. The remote assistance apparatus includes an assigning unit that schedules the calls that are transmitted from the plurality of vehicles and assigning the calls to any of a plurality of operators. The calling unit transmits a cancelation of the call to the remote assistance apparatus when a reason for the call is resolved after the call is made. The assigning unit cancels scheduling of the call that corresponds to the cancelation that is transmitted from the vehicle.

DESCRIPTION OF THE EMBODIMENTS

The following embodiments relate to a vehicle remote assistance system that performs assignment of an operator to a call to provide assistance by an operator when a vehicle calls an operator, a remote assistance apparatus, a remote assistance method, and a remote assistance program.

A service in which an operator at an assistance center remotely provides assistance to a vehicle when the vehicle requires assistance has been proposed (for example, refer to Japanese Patent No. 5550671). In this service, for example, regarding an autonomous driving vehicle, in a case in which the vehicle is unable to move based on determination by the vehicle and is stranded, a case in which the vehicle is in an accident, a case in which the vehicle is actively requesting assistance from an operator, and the like, the vehicle makes an operator call to the assistance center.

When operator calls are simultaneously made from a plurality of vehicles and the operator at the assistance center is unable to respond the operator calls, the vehicles are required to wait until the operator is able to respond. Therefore, in the assistance center, when calls are received from a plurality of vehicles, the calls are scheduled and assigned to the operator in an appropriate order.

However, in scheduling of a plurality of calls that are received from a plurality of vehicles, when a number of calls exceed a number of operators, an operator cannot necessarily be immediately assigned when a call is received. A plurality of calls are placed in a queue and a waiting period occurs. In conventional vehicle remote assistance, if a reason for a call is resolved in a vehicle during the waiting period, assistance from an operator is no longer needed by the time the call is assigned to an operator. Even calls such as this in which assistance is no longer needed are required to be assigned to an operator and handled. Therefore, load that is placed on the operator increases.

It is thus desired to reduce load that is placed on an operator by suppressing unnecessary calls.

A first exemplary embodiment provides a vehicle remote assistance system that includes a plurality of vehicles and a remote assistance apparatus. Each of the plurality of vehicles includes a calling unit that transmits a call to the remote assistance apparatus. The remote assistance apparatus includes an assigning unit that schedules the calls that are transmitted from the plurality of vehicles and assigns the calls to any of a plurality of operators. The calling unit transmits a cancelation of the call to the remote assistance apparatus when a reason for the call is resolved after the call is made. The assigning unit cancels scheduling of the call that corresponds to the cancelation that is transmitted from the vehicle. The remote assistance apparatus schedules the call based on a priority level that becomes higher in accompaniment with a waiting period of the call.

The priority level becomes higher in order of: a case in which the waiting period is less than a minimum waiting period; a case in which the waiting period exceeds the minimum waiting period and falls below a maximum waiting period; and a case in which the waiting period exceeds the maximum waiting period. The assigning unit does not assign the call to the operator in response to the waiting period being less than the minimum waiting period.

A second exemplary embodiment provides a remote assistance apparatus that configures a vehicle remote assistance system together with a plurality of vehicles. The remote assistance apparatus includes: a receiving unit that receives calls that are transmitted from a calling unit provided in each of the plurality of vehicles; and an assigning unit that schedules the calls that are received by the receiving unit based on a priority level that becomes higher in accompaniment with a waiting period of the call, and assigns the calls to any of a plurality of operators. The calling unit transmits a cancelation of the call to the remote assistance apparatus when a reason for the call is resolved after the call is made. The assigning unit cancels scheduling of the call that corresponds to the cancelation that is transmitted from the vehicle.

The priority level becomes higher in order of: a case in which the waiting period is less than a minimum waiting period; a case in which the waiting period exceeds the minimum waiting period and falls below a maximum waiting period; and a case in which the waiting period exceeds the maximum waiting period. The assigning unit does not assign the call to the operator in response to the waiting period being less than the minimum waiting period.

The third exemplary embodiment provides a remote assistance method for assigning an operator to remotely assist a plurality of vehicles. The remote assistance method includes: receiving calls that are transmitted from the plurality of vehicles; scheduling the calls that are received based on a priority level that becomes higher in accompaniment with a waiting period of the call, and assigning the calls to any of a plurality of operators; receiving a cancelation of the call; and canceling scheduling of the call that corresponds to the cancelation based on reception of the cancelation. The priority level becomes higher in order of: a case in which the waiting period is less than a minimum waiting period; a case in which the waiting period exceeds the minimum waiting period and falls below a maximum waiting period; and a case in which the waiting period exceeds the maximum waiting period. The call is not assigned to the operator, in response to the waiting period being less than the minimum waiting period.

The fourth exemplary embodiment provides a non-transitory computer-readable storage medium storing therein a remote assistance program for assigning an operator to remotely assist a plurality of vehicles, the remote assistance program causing an information processing apparatus including a receiving unit to implement: scheduling a call that is received from a vehicle by the receiving unit based on a priority level that becomes higher in accompaniment with a waiting period of the call, and assigning the call to any of a plurality of operators; and canceling, based on a cancelation of the call that is received from the vehicle by the receiving unit, scheduling of the call that corresponds to the cancelation. The priority level becomes higher in order of a case in which the waiting period is less than a minimum waiting period; a case in which the waiting period exceeds the minimum waiting period and falls below a maximum waiting period; and a case in which the waiting period exceeds the maximum waiting period. The call is not assigned to the operator, in response to the waiting period being less than the minimum waiting period.

An embodiment of the present disclosure will hereinafter be described with reference to the drawings. Here, the embodiment described below is an example of implementation of the present disclosure and does not limit the present disclosure to the specific configurations described below. In implementation of the present disclosure, specific configurations according to the embodiment may be used as appropriate.

Figure 1:
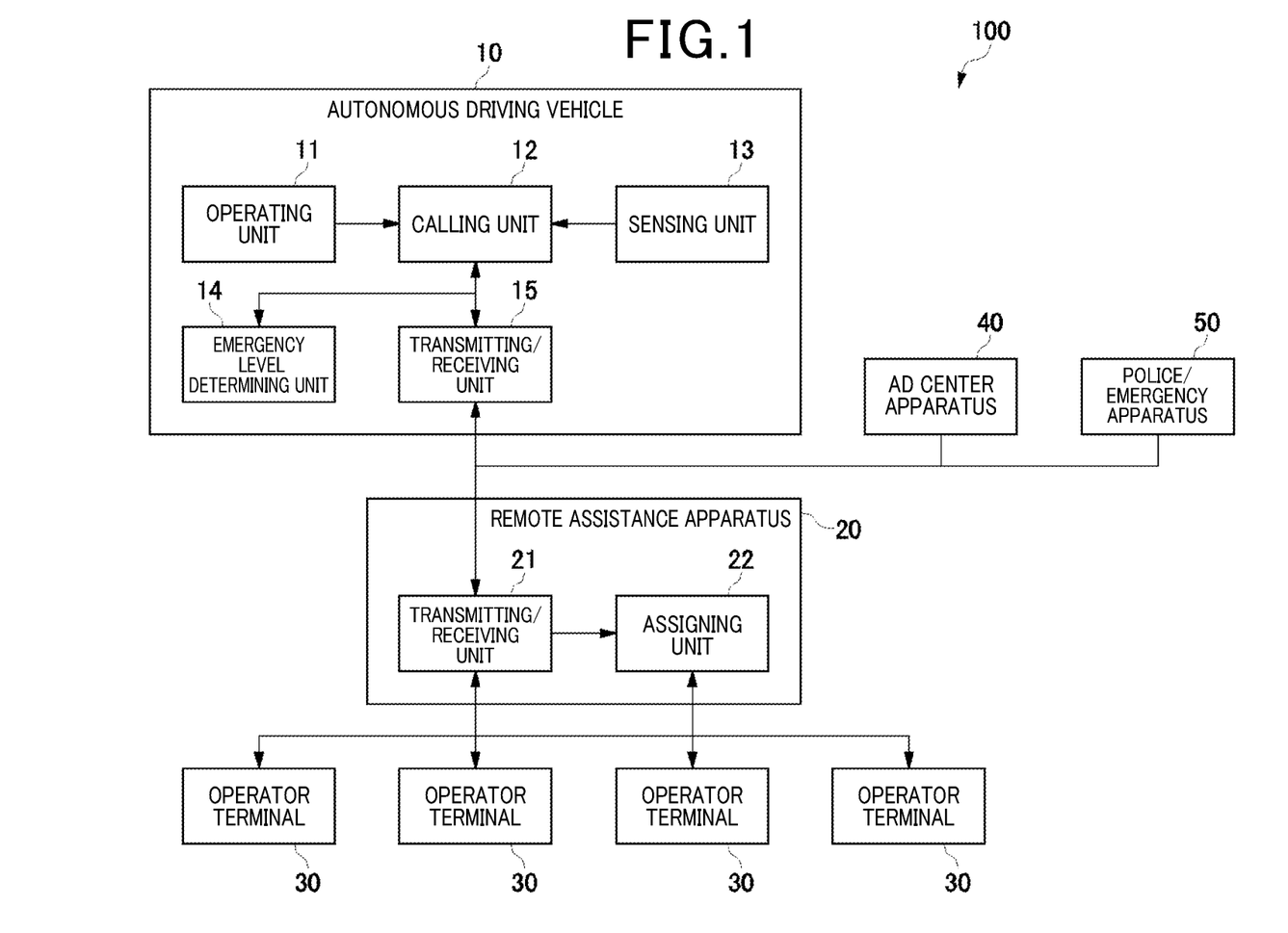
FIG. 1 is a block diagram illustrating a configuration of a remote assistance system according to an embodiment.

FIG. 1 is a block diagram of a configuration of a vehicle remote assistance system according to the embodiment. A vehicle remote assistance system 100 includes an autonomous driving vehicle (referred to, hereafter, as an "AD vehicle") 10, a remote assistance apparatus 20, a plurality of operator terminals 30, an autonomous driving (AD) center apparatus 40, and a police/emergency apparatus 50.

FIG. 1 shows only a single AD vehicle 10. However, a plurality of AD vehicles 10 can simultaneously use a single remote assistance apparatus 20. The AD vehicle 10 and the remote assistance apparatus 20 perform communication over a communication network. The AD vehicle 10 can be wirelessly connected to the communication network. The AD vehicle 10 may be connected to the communication network using a mobile phone network. Alternatively, the AD vehicle 10 may be connected to the communication network through a public wireless local area network (LAN).

The remote assistance apparatus 20 is an apparatus that is operated by a provider of a vehicle remote assistance service. The remote assistance apparatus 20 is communicably connected to the plurality of operator terminals 30. In an assistance center, a plurality of operators are on standby. Each operator is assigned a single operator terminal 30.

Each AD vehicle 10 is capable of making an operator call to the remote assistance apparatus 20. When the operator call is received from the AD vehicle 10, the remote assistance apparatus 20 assigns an operator to the call. Specifically, when the call is received, the remote assistance apparatus 20 schedules the call and performs operator assignment. As a result, communication between the AD vehicle 10 that has made the call and the operator terminal 30 of the assigned operator is established. The remote assistance apparatus 20 establishes the communication between the AD vehicle 10 that has made the call and the operator terminal 30 that is assigned the call.

According to the present embodiment, the remote assistance apparatus 20 also provides a function as a relay that relays communication between the AD vehicle 10 and the operator terminal 30. However, this relay function may be provided by an apparatus other than the remote assistance apparatus 20.

In addition, the AD center apparatus 40 and the police/emergency apparatus 50 can be connected to the remote assistance apparatus 20 through the communication network. In a manner similar to the AD vehicle 10, the AD center apparatus 40 and the police/emergency apparatus 50 are also capable of making an operator call to the remote assistance apparatus 20.

When the operator terminal 30 is connected to any of the AD vehicles 10 and when the connection is broken, the operator terminal 30 gives notification thereof to the remote assistance apparatus 20. As a result, an assigning unit 22 of the remote assistance apparatus 20 can ascertain which of the plurality of operator terminals 30 are in operation, which are on standby, that is, which operators are available, and how many operators are available.

The AD vehicle 10 includes an operating unit 11, a sensing unit 13, a calling unit 12, an emergency level determining unit 14, and a transmitting/receiving unit 15. The operating unit 11 is a switch, a touch panel, or the like that is operated by a passenger of the AD vehicle 10 to make an operator call. The operating unit 11 outputs, to the calling unit 12, an operation signal that is based on an operation that is received. The sensing unit 13 is a sensor that detects a physical quantity of light, acceleration, radio waves, sound, rotation frequency, or the like. The sensor that detects light also includes an image sensor that configures a camera. The sensor that detects radio waves also includes a reception antenna of a millimeter-wave radar.

A plurality of sensors for detecting internal and external states of the AD vehicle 10 are provided in the AD vehicle 10 as the sensing unit 13. A sensing result (presence/absence of a sensing target or a detection value) of each sensor is outputted to the calling unit 12. The calling unit 12 determines a state in which the AD vehicle 10 is placed based on the sensing results of the sensing unit 13. The calling unit 12 may be a portion of an autonomous driving control unit that generates a command for each driving system for autonomous driving based on the sensing results.

As state determination, for example, the calling unit 12 may perform recognition, determination, calculation, and acknowledgment such as the following. Through recognition of an image of a vicinity of the AD vehicle 10 that is acquired by an image sensor, presence of an obstacle, another vehicle, a pedestrian, or the like in the vicinity of the AD vehicle 10 is recognized, and a size, a movement direction, a distance, and the like thereof are determined.

In addition, the calling unit 12 recognizes the presence of an obstacle or the like based on a detection result from the millimeter wave radar and determines the distance and the like thereof. Furthermore, the calling unit 12 calculates a speed of the AD vehicle 10 based on a detection value of a sensor that detects a rotation frequency of a wheel. In addition, the calling unit 12 acknowledges a collision of the AD vehicle 10 based on a detection value of an acceleration sensor.

The calling unit 12 determines whether an operator call is necessary based on the result of state determination. When determined that operator call is necessary, the calling unit 12 generates a call and outputs the call to the emergency level determining unit 14 and the transmitting/receiving unit 15, together with information on a reason for the determination.

In addition, the calling unit 12 generates the call based also on the operating signal from the operating unit 11. At this time, a call reason may be determined based on operation details of the operating unit 11. Alternatively, the emergency level determining unit 14 may determine an emergency level based on the operation details of the operating unit 11.

For example, in a case in which the AD vehicle 10 is provided with an emergency call button that is operated when the emergency level is high and an operator assistance button that is operated when the emergency level is low as the operating unit 11, when the emergency call button is operated, the emergency level determining unit 14 may determine the emergency level to be "high." When the operator assistance button is operated, the emergency level determining unit 14 may determine the emergency level to be "low." Furthermore, when the operating unit 11 is a touch panel, the passenger may input or select the call reason.

For example, when the AD vehicle 10 remains stopped in a period that exceeds a predetermined threshold, the calling unit 12 may output the call together with the call reason that indicates that a stopping period exceeds the threshold. In addition, for example, when a traveling path of the AD vehicle 10 is blocked by a roadside parked vehicle and the AD vehicle 10 is required to cross a centerline to advance while avoiding the roadside parked vehicle, and safety when the centerline is crossed is determined to not be ensured, the calling unit 12 may output the call together with the call reason that indicates stranding as a result of a roadside parked vehicle.

Furthermore, for example, when the detection value of the acceleration sensor exceeds a predetermined threshold (such as 100 m/s$^2$), the calling unit 12 may determine that the AD vehicle 10 has collided (or has been collided with) and output the call together with the call reason that indicates that acceleration exceeds the threshold or a collision has occurred.

The emergency level determining unit 14 determines the emergency level of the call based on the state that is sensed by the sensing unit 13. Specifically, the emergency level determining unit 14 determines the emergency level of the call based on the call reason that is determined by the calling unit 12 based on the state that is sensed by the sensing unit 13. Therefore, the emergency level determining unit 14 includes an emergency level table that prescribes a relationship between all call reasons that may be determined by the calling unit 12 and the emergency levels thereof.

When a call request is received together with the call reason from the calling unit 12, the emergency level determining unit 14 references the emergency level table and determines the emergency level that corresponds to the call reason. Here, the emergency level determining unit 14 may determine the emergency level by directly using the state that is sensed by the sensing unit 13. For example, when the acceleration sensor detects acceleration that exceeds a predetermined threshold (such as 100 m/s$^2$), the emergency level determining unit 14 may immediately determine that the emergency level is the highest.

The transmitting/receiving unit 15 transmits the operator call, together with the emergency level that is determined by the emergency level determining unit 14, to the remote assistance apparatus 20. For example, the transmitting/receiving unit 15 may be a wireless communication module for connecting to a mobile phone network of a predetermined carrier. The operator call includes a vehicle identifier (ID) for identifying the AD vehicle 10, a call ID for identifying the call of the AD vehicle 10, and the call reason.

The remote assistance apparatus 20 includes a transmitting/receiving unit 21 and an assigning unit 22. The transmitting/receiving unit 21 is a communication interface for connecting to a communication network. The assigning unit 22 is actualized by a general-purpose processor (such as a central processing unit [CPU]) running a remote assistance program according to the present embodiment while using a memory, a storage medium, a dedicated processor, and the like as required. The remote assistance program may be provided to a computer over a wired or wireless communication network. Alternatively, the remote assistance program may be stored in a computer-readable non-transitory storage medium and provided to the computer by the computer reading the remote assistance program from the storage medium.

The assigning unit 22 schedules a plurality of calls that are transmitted from a plurality of AD vehicles 10 based on priority levels that become higher in accompaniment with the waiting period of the call, and assigns the calls to any of a plurality of operators. Here, the priority levels are divided into a plurality of levels based on a length of the waiting period. The priority level is "low" when the waiting period is less than a minimum waiting period. The priority level is "medium" when the waiting period exceeds the minimum waiting period and falls below a maximum waiting period.

The priority level is "high" when the waiting period exceeds the maximum waiting period. The priority levels become higher in this order.

Figure 2:
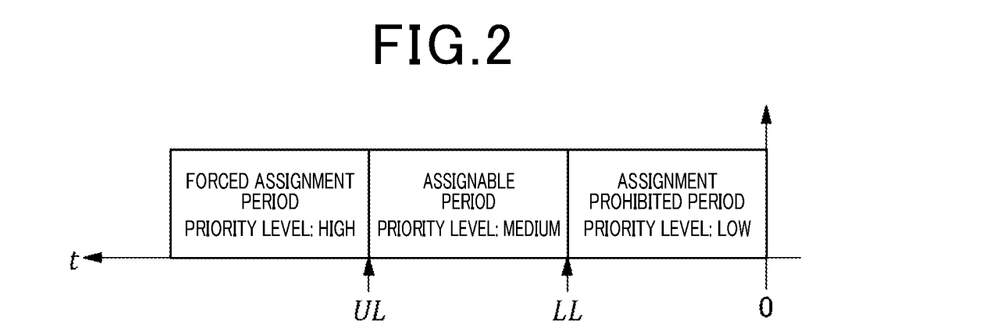
FIG. 2 is a diagram illustrating a relationship between a minimum waiting period, a maximum waiting period, and priority levels according to the embodiment.

FIG. 2 is a diagram of a relationship between the minimum waiting period and the maximum waiting period, and the priority levels. As shown in FIG. 2, when an elapsed time from when the call is issued from the AD vehicle 10 (or reaches the remote assistance system 20), that is, the waiting period is equal to or greater than 0 seconds and equal to or less than a minimum waiting period LL, the priority level is "low." The assigning unit 22 does not assign the call to an operator during this period.

When time elapses and the waiting period exceeds the minimum waiting period LL and falls below the maximum waiting period UL, the assigning unit 22 assigns the call to an operator in order of arrival when an occupancy rate of the operators of which there is a plurality is equal to or less than a predetermined threshold (such as 60%).

When time further elapses without an operator being assigned and the waiting period exceeds the maximum waiting period UL, the assigning unit 22 assigns the call to an available operator in order of arrival regardless of the occupancy rate of the operators.

According to the present embodiment, during the period in which the priority level is "low," the assigning unit 22 does not assign an operator. Therefore, unnecessary calls are suppressed and operator occupancy and load can be suppressed. Here, instead of the foregoing, when the priority level is "low," the assigning unit 22 may use a threshold (such as 30%) for the occupancy rate of the operators that is lower than that of the period in which the priority level is "medium," and may assign an operator only when the occupancy rate is lower than this threshold. Unnecessary calls can be suppressed by this configuration as well.

In addition, according to the present embodiment, during the period in which the priority level is "high," the assigning unit 22 forcibly assigns an operator when an available operator is present, regardless of the occupancy rate of the operators. In this manner, as a result of an operator being assigned to a call of which a predetermined amount of time (that is, the maximum waiting period UL) has elapsed, occurrence of a call to which an operator is not assigned no matter how much time passes can be prevented.

Figure 3:
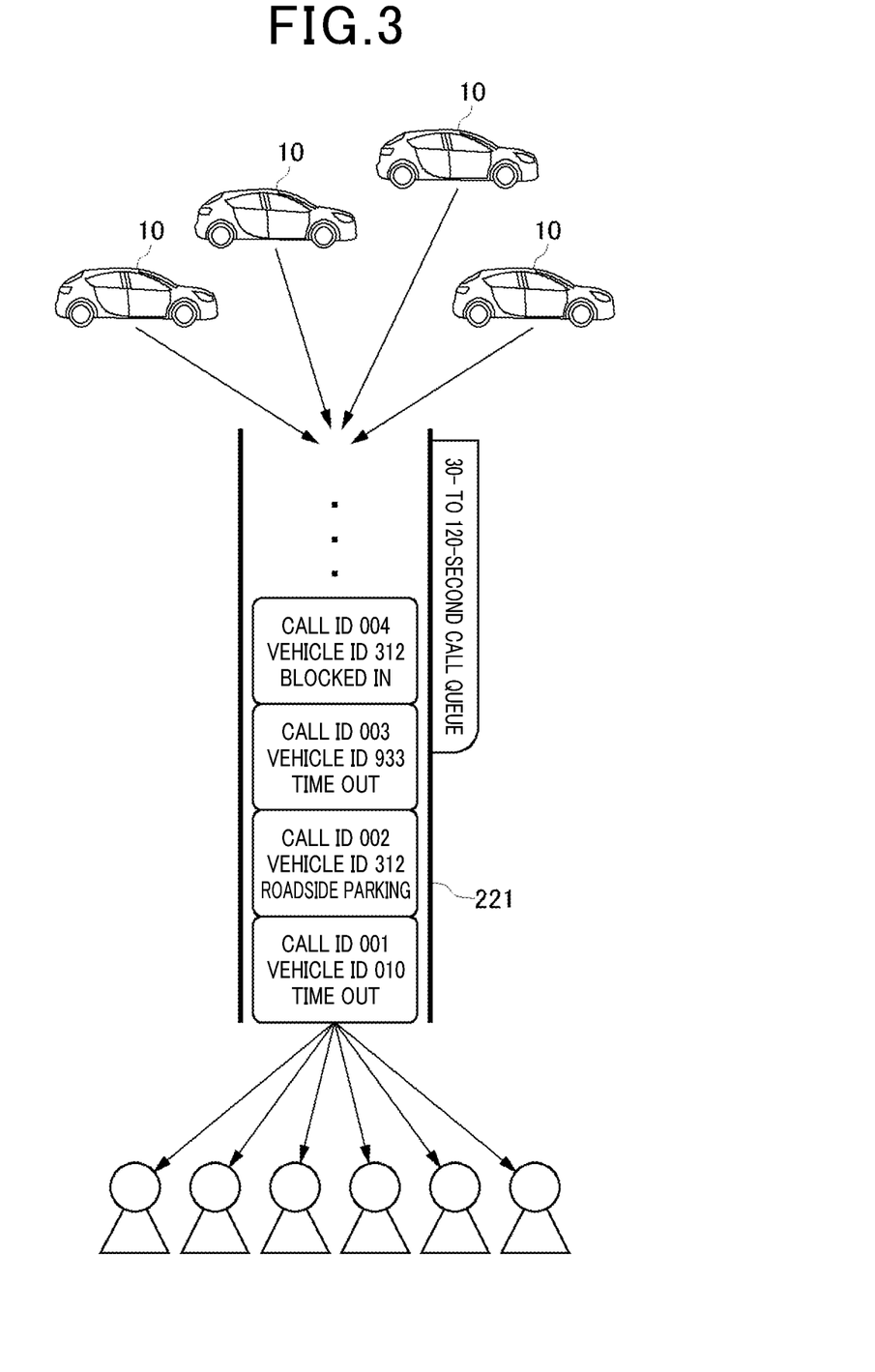
FIG. 3 is a diagram illustrating a queue of a plurality of calls according to the embodiment.

FIG. 3 is a diagram of a queue of a plurality of calls according to the embodiment. When calls are made from a plurality of AD vehicle 10, the assigning unit 22 generates a queue 221 in which the calls are arrayed in order of arrival. In this queue 221, the minimum waiting period LL is 30 seconds and the maximum wait time UL is 120 seconds. The assigning unit 22 determines whether a head call in the queue 221 satisfies a call condition. When the condition is satisfied, the assigning unit 22 assigns an operator.

That is, when the waiting period of the head call is equal to or less than the minimum waiting period LL, the assigning unit 22 determines that this call does not satisfy the condition. When the waiting period of the head call exceeds the minimum waiting period LL but does not reach the maximum waiting period UL, the assigning unit 22 determines that the condition is satisfied when the occupancy rate of the operators is equal to or less than a predetermined threshold, and determines that the condition is not satisfied when the occupancy rate is equal to or greater than the threshold. In addition, when the waiting period of the head call has already exceeded the maximum waiting period UL, the assigning unit 22 determines that the condition is satisfied. Here, when the waiting period exceeds the maximum waiting period UL, no operators may be available. In this case, the call remains placed at the head of the queue 221 without the assignment process being completed.

The assigning unit 22 may dynamically adjust the minimum waiting period LL and/or the maximum waiting period UL based on an occupancy state of the operators. That is, when the occupancy rate of the operators is low, the assigning unit 22 may adjust the minimum waiting period LL and/or the maximum waiting period UL to be shorter. Conversely, when the occupancy rate of the operators is high, the assigning unit 22 may adjust the minimum waiting period LL and/or the maximum waiting period UL to be longer. Here, such adjustment of the minimum waiting period LL and/or the maximum waiting period UL can be performed in examples in FIG. 4 and FIG. 5, described below, as well.

When assignment of an operator to the head call is successful, the assigning unit 22 removes the call from the queue 221 and moves up the order of all calls that are waiting in the queue.

Figure 4:
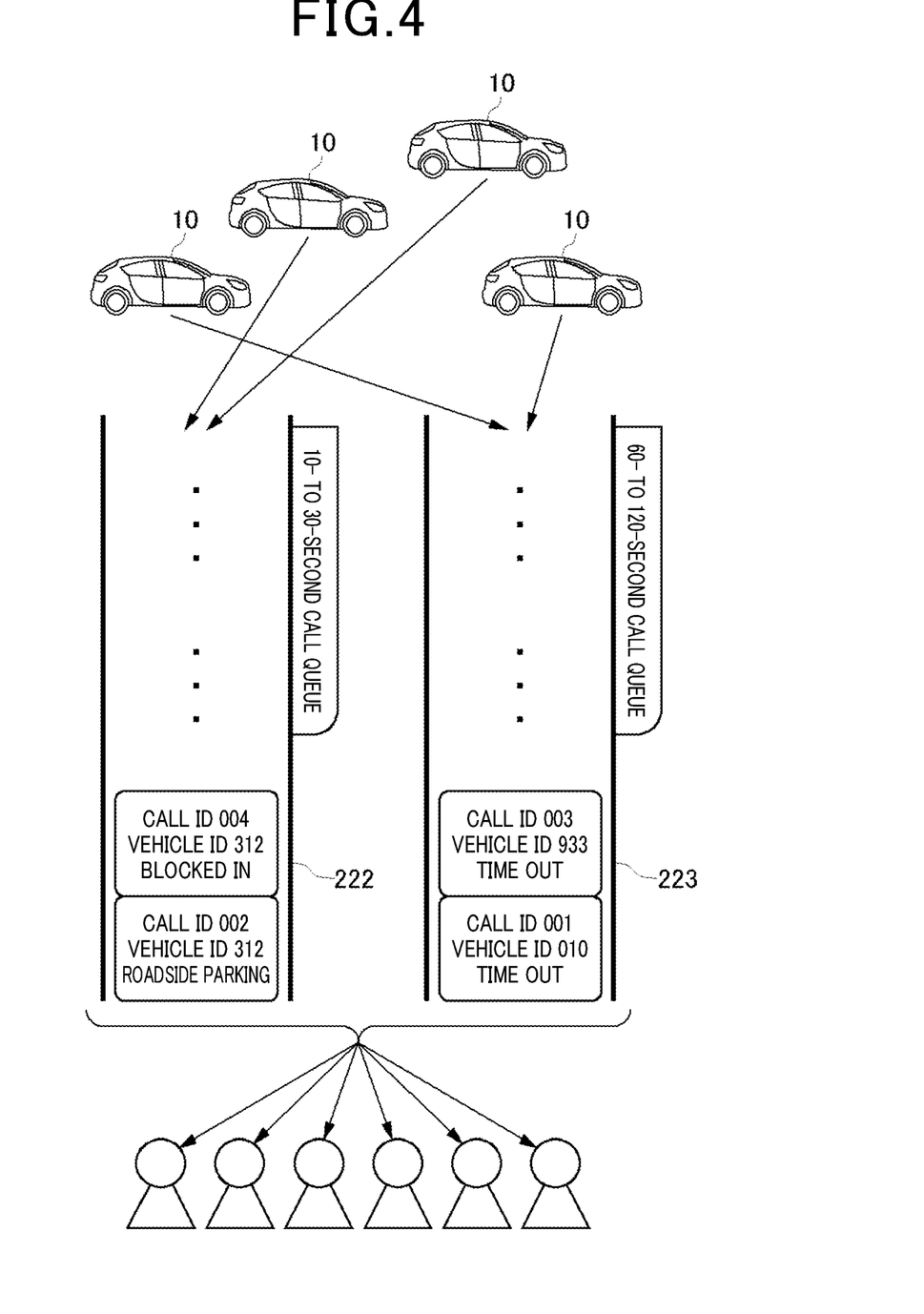
FIG. 4 is a diagram illustrating an example in which two types of queues are used.

The assigning unit 22 according to the present embodiment has a plurality of types of queues that are applied based on the emergency level of the call. FIG. 4 is a diagram of an example in which two types of queues according to the embodiment are used. As shown in FIG. 4, the assigning unit 22 has a plurality of queues of which the combinations of the minimum waiting period LL and the maximum waiting period UL differ. In the example in FIG. 4, a queue 222 in which the minimum waiting period LL is 10 seconds and the maximum waiting period UL is 30 seconds, and a queue 223 in which the minimum waiting period LL is 60 seconds and the maximum waiting period UL is 120 seconds are shown.

The assigning unit 22 selects any of the plurality of types of queues based on the emergency level that is transmitted from the AD vehicle 10 together with the operator call, and allocates the call to the selected queue. In the example in FIG. 4, the emergency level determining unit 14 selects either of "high" and "low" as the emergency level and provides the emergency level to the remote assistance apparatus 20 together with the call. The assigning unit 22 allocates a call that has a "high" emergency level to the queue 222 of which the minimum waiting period LL and the maximum waiting period UL are both relatively short periods, and allocates a call that has a "low" emergency level to the queue 223 of which the minimum waiting period LL and the maximum waiting period UL are both relatively long periods.

When a traveling state of the AD vehicle 10 is abnormal, the emergency level determining unit 14 determines that the emergency level is "high." When the traveling state of the AD vehicle 10 is normal, the emergency level determining unit 14 determines that the emergency level is "low." Specifically, in the example in FIG. 4, regarding calls of which the call reason is "blocked in" or "roadside parking," the emergency level determining unit 14 recognizes that the traveling state is abnormal based on the call reason and determines that the emergency level is "high."

In addition, when the call reason is "time out" (that is, when the stopping period exceeds a predetermined value), the emergency level determining unit 14 recognizes that the traveling state is normal based on the call reason and determines that the emergency level is "low." The assigning unit 22 allocates the call of which the emergency level is "high" to the queue 222 of which the minimum waiting period LL and the maximum waiting period UL are both relatively short, and allocates the call of which the emergency level is "low" to the queue 223 of which the minimum waiting period LL and the maximum waiting period UL are both relatively long.

Figure 5:
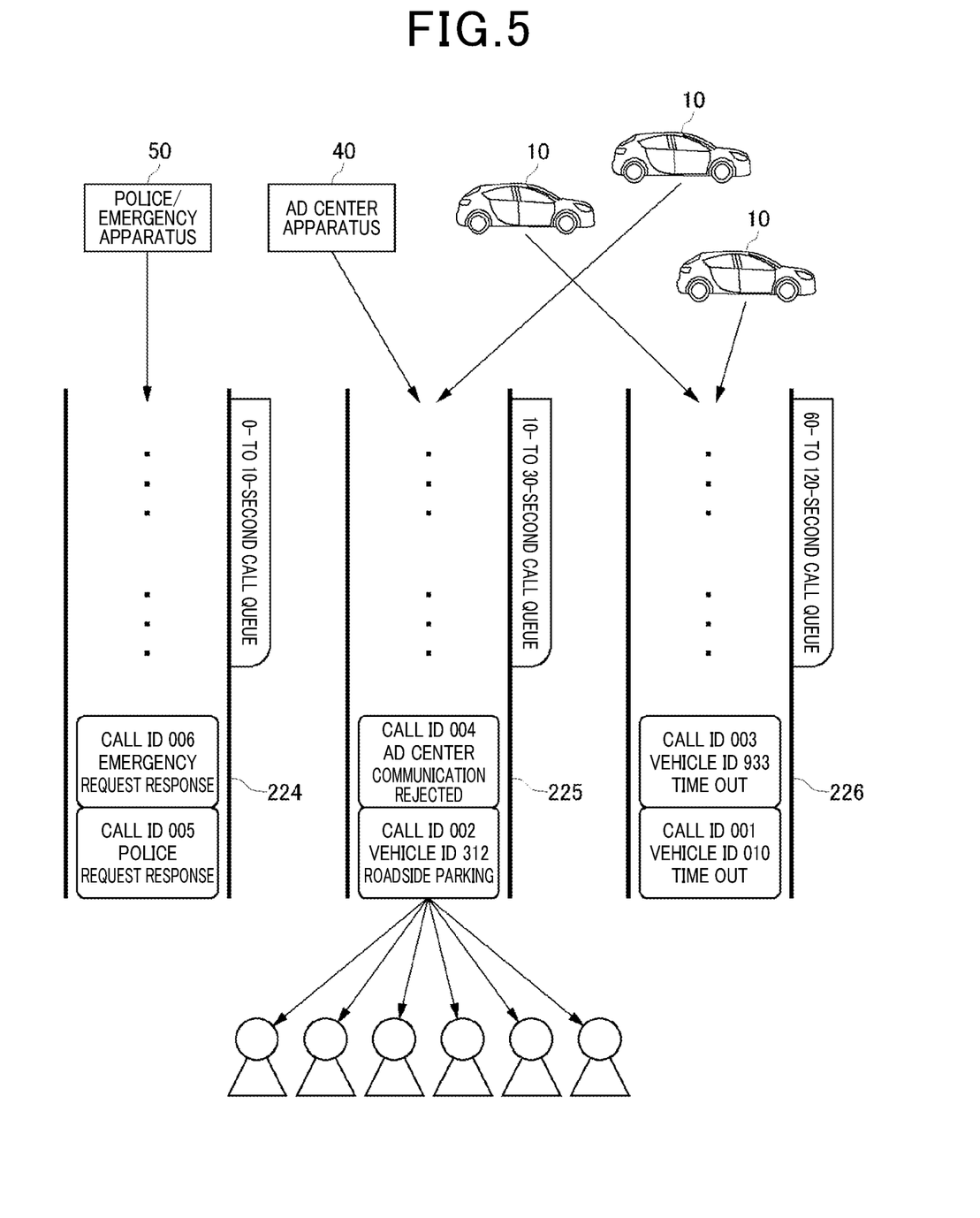
FIG. 5 is a diagram illustrating an example in which three types of queues are used.

FIG. 5 is a diagram of an example in which three queues according to the embodiment are used. In this case, the assigning unit 22 has three types of queues of which the combinations of the minimum waiting period LL and the maximum waiting period UL differ. In addition, in this case, the emergency level determining unit 14 determines any of "highest," "high," and "low" as the emergency level.

A queue 224 is a queue for calls that have the "highest" emergency level. A queue 225 is a queue for calls that have a "high" emergency level. A queue 226 is a queue for calls that have a "low" emergency level. The assigning unit 22 allocates police request and emergency request calls from the police/emergency apparatus 50 to the queue 224 for calls that have the "highest" emergency level. In addition, the assigning unit 22 allocates calls from the AD center apparatus 40 to the queue 225 that has the "high" emergency level.

The minimum waiting period LL for the queue 224 that has the "highest" emergency level is 0 seconds and the maximum waiting period UL is 10 seconds. That is, in the queue 224, a call of which the waiting period is less than 10 seconds is assigned to an operator if the operator occupancy is equal to or less than a predetermined threshold, and a call of which the wait time exceeds 10 seconds is forcibly assigned to an available operator.

In addition, although not shown as an example in FIG. 5, in cases in which the calling unit 12 of the AD vehicle 10 determines that an accident has occurred as well, a call is transmitted from the AD vehicle 10 to the remote assistance apparatus 20 with this occurrence of an accident as the call reason, and the emergency level determining unit 14 determines the emergency level of this call to be "highest" at this time.

In the example in FIG. 5, when the emergency level is "high," in a manner similar to that in the example in FIG. 4, the call is allocated to the queue 225 of which the minimum waiting period LL and the maximum waiting period UL are relatively short. When the emergency level is "low," in a manner similar to that in the example in FIG. 4, the call is allocated to the queue 226 of which the minimum waiting period LL and the maximum waiting period UL are relatively long.

When a plurality of queues are provided as shown in FIG. 4 and FIG. 5, the assigning unit 22 assigns the calls in each queue in a following manner. That is, first, the assigning unit 22 acquires the head call of each queue and determines the priority levels thereof. When the priority level is not "high" (that is, when the priority level is "medium" or "low"), the call is assigned to an operator when the call condition is satisfied. The call is ignored when the call condition is not satisfied.

Regarding the head call of a queue, when the priority level thereof is "high" (that is, the priority level is the highest), the assigning unit 22 assigns the call to an available operator. When an available operator is not present, the assigning unit 22 waits until any of the operators becomes available and assigns the call to the operator. When assignment of an operator is completed for a certain call, a similar process is performed for the head call of the other queue when the priority level thereof is "high." After processing of the head call of which the priority level is "high" is completed for all queues, processing of the head calls of the acquired queues is ended.

Figure 6:
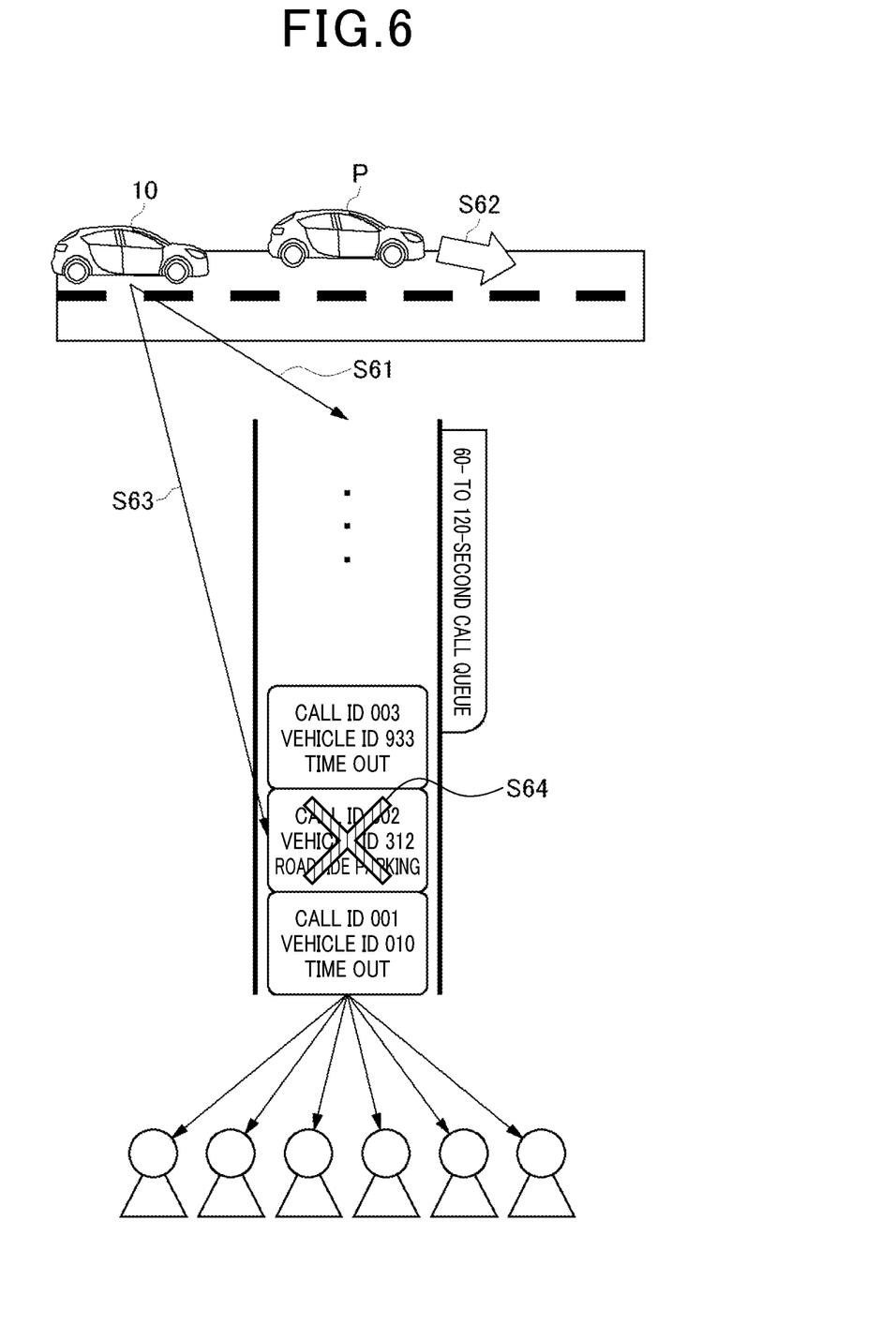
FIG. 6 is a diagram for explaining a cancel function according to the embodiment.

Next, a call cancelation function that is provided by the vehicle remote assistance system 100 according to the present embodiment will be described. FIG. 6 is a diagram for explaining the cancelation function according to the embodiment. When the AD vehicle 10 is no longer able to travel as a result of a roadside parked vehicle P being present ahead, the AD vehicle 10 transmits a call to the remote assistance apparatus 20 (step S61). This call is placed in a predetermined queue and awaits its turn for assignment.

During this time, the AD vehicle 10 waits in a state in which the AD vehicle 10 is unable to travel. However, when the roadside parked vehicle P starts to travel while the AD vehicle 10 is waiting (step S62), the AD vehicle 10 is also able to travel because the obstacle ahead is no longer present.

In such cases, the AD vehicle 10 identifies the vehicle ID of the AD vehicle 10 and the corresponding call ID and transmits a call cancelation to the remote assistance apparatus 20 (step S63). When the cancelation from the AD vehicle 10 is received, the remote assistance apparatus 20 removes the corresponding call from the queue and cancels the scheduling of this call (step S64).

As a result of the call being canceled in this manner, a call that has become unnecessary during a wait can be prevented from being assigned to an operator. Therefore, operator assignment load on the assigning unit 22 and response load on the operator can be reduced. In addition, other calls that require response from operators can be more quickly assigned to the operators.

According to the present embodiment, in particular, because the minimum waiting period LL is set and a period until the minimum waiting period LL is reached is a period during which assignment to the operator is prohibited, calls that become unnecessary during this prohibited period can be expected to be canceled.

Figure 7:
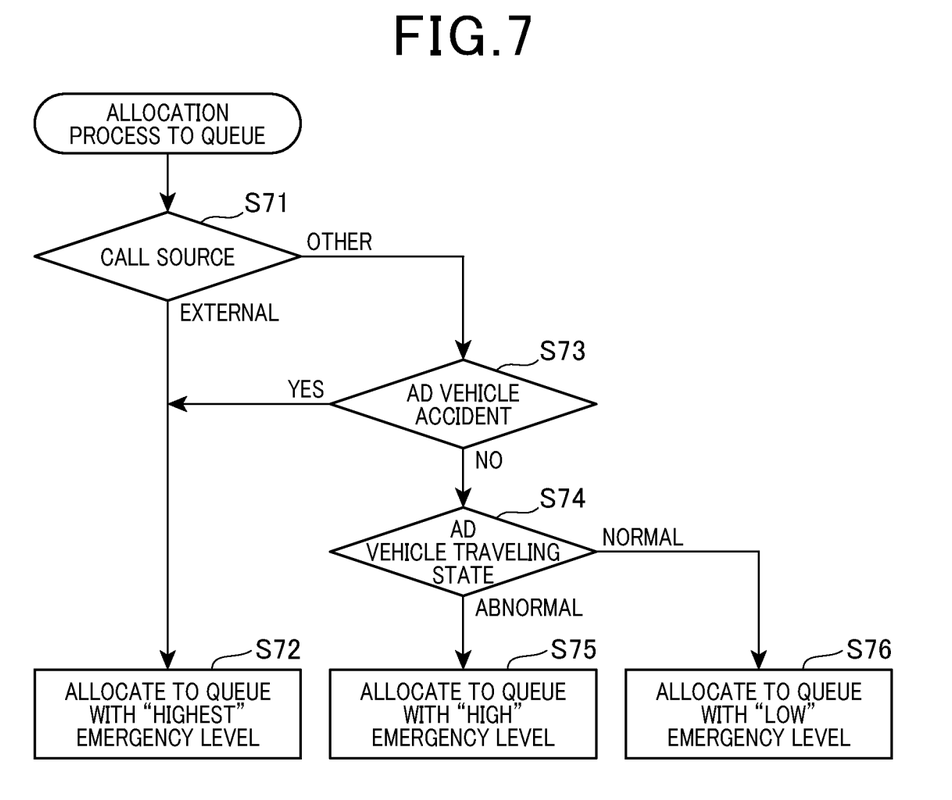
FIG. 7 is a flowchart illustrating an allocation process of a call to a queue according to the embodiment.

FIG. 7 is a flowchart of an allocation process of a call to a queue according to the embodiment. As shown in FIG. 7, first, a request source of the call is determined (step S71). When the request source of the call is external ("external" at step S71), that is, the AD center apparatus 40 or the police/emergency apparatus 50, the call is allocated to the queue that has the "highest" emergency level (step S72).

When the request source of the call is other than external ("other" at step S71) that is, the AD vehicle 10, first, whether the call reason of the call is an accident is determined (step S73). When the call reason is an accident ("Yes" at step S73), the call is allocated to the queue that has the "highest" emergency level (step S72).

Meanwhile, when the call reason is not an accident ("No" at step S73), the traveling state of the AD vehicle 10 is determined (step S74). When the traveling state of the AD vehicle 10 is abnormal ("abnormal" at step S74), the call is allocated to the queue that has the "high" emergency level (step S75). When the traveling state of the AD vehicle 10 is normal ("normal" at step S74), the call is allocated to the queue that has the "low" emergency level (step S76).

As described above, the assigning unit 22 has a plurality of queues of which the combinations of the minimum waiting period LL and the maximum waiting period UL differ, and allocates the received call to any of the queues based on the emergency level thereof. Therefore, an operator can be more quickly assigned to a call that has a high emergency level.

Figure 8:
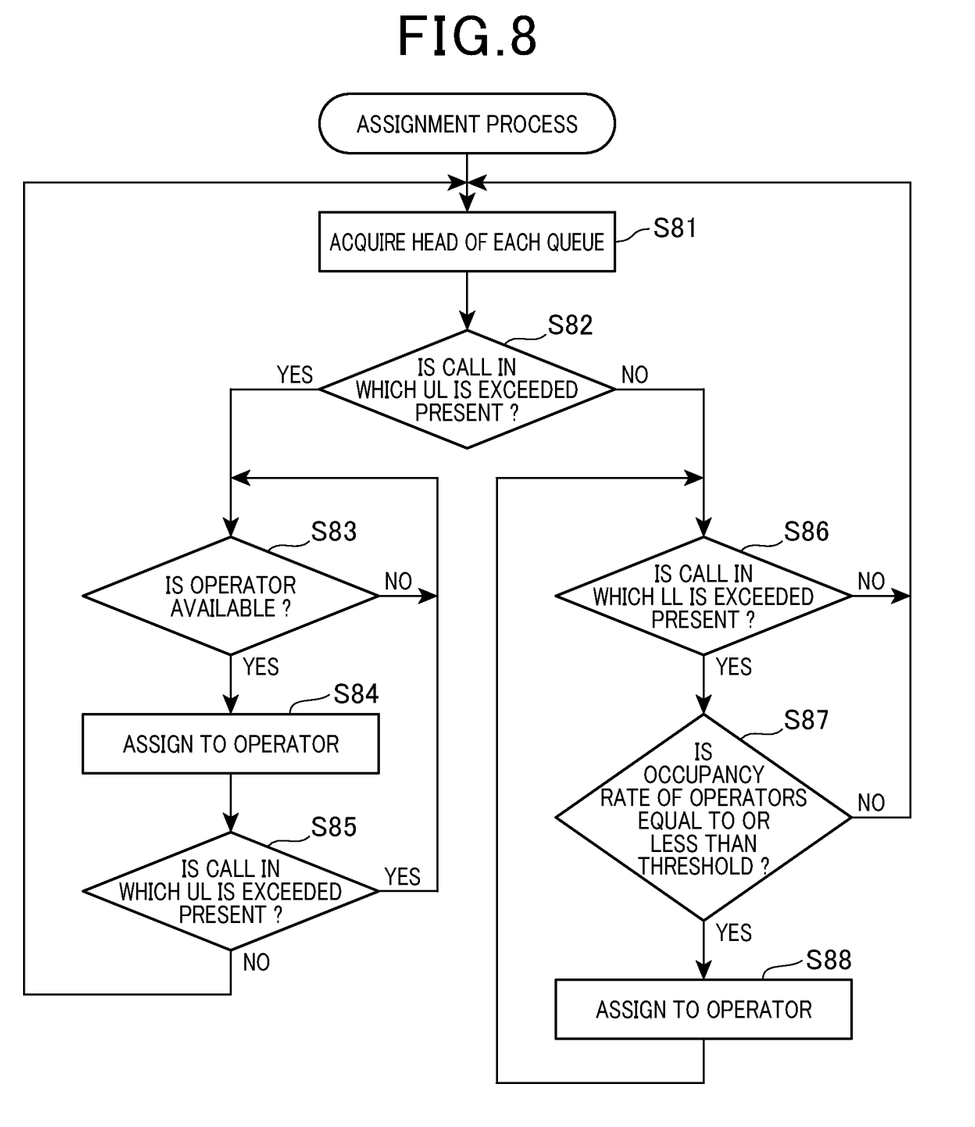
FIG. 8 is a flowchart illustrating an assignment process by an assigning unit according to the embodiment.

FIG. 8 is a flowchart of an assignment process performed by the assigning unit according to the embodiment. First, the assigning unit 22 acquires the head call from each of the plurality of queues (step S81). Next, the assigning unit 22 determines whether a call of which the waiting period exceeds the maximum waiting period UL is present among the head calls (step S82).

When a call of which the waiting period exceeds the maximum waiting period UL is present ("Yes" at step S82), the assigning unit 22 determines whether an operator is available (step S83). As described above, information regarding whether the operator terminal 30 is in operation is sent from each operator terminal 30 to the remote assistance apparatus 20. The assigning unit 22 can ascertain which of the operator terminals is not in operation.

When an operator is available ("Yes" at step S83), the assigning unit 22 assigns the call of which the waiting period exceeds the maximum waiting period UL to the available operator (step S84). When an operator is not available ("No" at step S83), the assigning unit 22 monitors availability state of the operators until an operator becomes available (step S83). When assignment of an operator to a certain call (step S84) is completed, the assigning unit 22 determines whether another call of which the waiting period exceeds the maximum waiting period UL is present (step S85).

When another call of which the waiting period exceeds the maximum waiting period UL is further present among the plurality of head calls acquired at step S81 ("Yes" at step S85), the assigning unit 22 returns to step S83. The assigning unit 22 determines whether an operator is available (step S83) and assigns the operator to the call (step S84).

When a call of which the waiting period exceeds the maximum waiting period UL is no longer present among the plurality of head calls acquired at step S81 ("No" at step S82), the assigning unit 22 returns to step S81. The assigning unit 22 acquires the head calls of the queues again (step S81).

When a call of which the waiting period exceeds the maximum waiting period UL is not present among the acquired plurality of head calls ("No" at step S82), the assigning unit 22 determines whether a call of which the waiting period exceeds the minimum waiting period is present among the calls (step S86). When a call of which the waiting period exceeds the minimum waiting period LL is present ("Yes" at step S86), the assigning unit 22 determines whether the occupancy rate of the operators is equal to or less than a predetermined threshold (step S87). When the occupancy rate of the operators is equal to or less than the threshold ("Yes" at step S87), the assigning unit 22 assigns an available operator to the call (step S88).

When the occupancy rate of the operators is greater than the threshold ("No" at step S87), the assigning unit 22 returns to step S81 and acquires the head calls of the queues (step S81). When an operator is assigned to a certain call (step S88), the assigning unit 22 returns to step S86. The assigning unit 22 determines whether a call of which the waiting period exceeds the minimum waiting period LL is present among the plurality of head calls acquired at step S81 (step S86).

When a call of which the waiting period exceeds the minimum waiting period LL is not present among the head calls ("No" at step S86), the assigning unit 22 returns to step S81 and acquires the head calls of the queues again (step S81). In addition, when the occupancy rate of the operators exceeds the threshold ("No" at step S87) as well, the assigning unit 22 returns to step S81 and acquires the head calls of the queues again (step S81).

As described above, the assigning unit 22 acquires the head calls from the plurality of queues and performs assignment of the calls based on the priority levels. Therefore, calls with high priority levels can be preferentially assigned to operators.

Here, in the remote assistance apparatus 20, when the assignment process is performed based on the flowchart in FIG. 8, a cancelation process is also performed in parallel. In the cancelation process, the remote assistance apparat 20 monitors whether a call cancelation is received from the AD vehicle 10 by the transmitting/receiving unit 21. When the cancelation is received, the remote assistance apparatus 20 interrupts the assignment process and performs a process to remove the call that is related to the received cancelation from the queue.

An embodiment of the vehicle remote assistance system is described above. However, the vehicle remote assistance system is not limited to the above-described embodiment. Various modifications can be made to the above-described embodiment. Variation examples are described below.

According to the above-described embodiment, the emergency level determining unit 14 that determines the emergency level of the call is provided in each AD vehicle 10. The determined emergency level is transmitted from the AD vehicle 10 to the remote assistance apparatus 20, together with the call. However, instead, the emergency level determining unit may be provided in the remote assistance apparatus 20. In this case, the AD vehicle 10 transmits the call reason to the remote assistance apparatus 20, together with the call. The emergency level determining unit of the remote assistance apparatus 20 determines the emergency level of the call based on the call reason.

At this time, information on a vehicle type and a road being traveled may also be transmitted from the AD vehicle 10 to the remote assistance apparatus 20, in addition to the call reason. The emergency level determining unit may determine the emergency level based on the information on the vehicle type and the traveling road as well.

Furthermore, according to the above-described embodiment, an example in which the AD vehicle 10, that is, the autonomous driving vehicle, receives operator assistance is described. For example, as the AD vehicle 10, a vehicle that has an autonomous driving level 4 may be suitable. However, the vehicle remote assistance system 100 can also be applied to a vehicle other than the autonomous driving vehicle and may be a system that remotely assists a vehicle that is driven by a driver.

What is claimed is:
1. A vehicle remote assistance system that includes a plurality of vehicles and a remote assistance apparatus, wherein:
   each of the plurality of vehicles includes a calling unit that transmits a call to the remote assistance apparatus;
   the remote assistance apparatus includes an assigning unit that schedules the calls that are transmitted from the plurality of vehicles, determines whether the calls satisfy a call condition, and assigns the calls to an operator of a plurality of operators in response to determining that the calls satisfy the call condition;
   the calling unit transmits a cancelation of the call to the remote assistance apparatus when a reason for the call is resolved after the call is made;
   the assigning unit cancels scheduling of the call that corresponds to the cancelation that is transmitted from a respective vehicle of the plurality of vehicles;
   the remote assistance apparatus schedules the call based on a priority level that becomes higher in accompaniment with a waiting period of the call;

the priority level becomes higher in order of: a case in which the waiting period is less than a minimum waiting period; a case in which the waiting period exceeds the minimum waiting period and falls below a maximum waiting period; and a case in which the waiting period exceeds the maximum waiting period; and in response to the waiting period being less than the minimum waiting period, the assigning unit determines that the call does not satisfy the call condition and does not assign the call to the operator.

2. The vehicle remote assistance system according to claim 1, wherein:

the assigning unit assigns the call to the operator in response to: the waiting period exceeding the minimum waiting period and falling below the maximum waiting period; and an occupancy rate of the plurality of operators being equal to or less than a predetermined threshold.

3. The vehicle remote assistance system according to claim 2, wherein:

the assigning unit assigns the call to the operator regardless of an occupancy rate of the plurality of operators in response to the waiting period exceeding the maximum waiting period.

4. The vehicle remote assistance system according to claim 3, wherein:

the assigning unit adjusts the minimum waiting period and/or the maximum waiting period based on an occupancy state of the plurality of operators.

5. The vehicle remote assistance system according to claim 4, comprising:

an emergency level determining unit that determines an emergency level of the call, wherein the assigning unit has a plurality of combinations of the minimum waiting period and the maximum waiting period, selects any of the plurality of combinations based on the emergency level that is determined by the emergency level determining unit, and uses the selected combination for scheduling.

6. The vehicle remote assistance system according to claim 5, wherein:

the emergency level determining unit is provided in a vehicle of the plurality of vehicles; and the calling unit transmits the emergency level that is determined by the emergency level determining unit to the remote assistance apparatus, together with the call.

7. The vehicle remote assistance system according to claim 6, wherein:

the vehicle includes a sensing unit that senses a state inside and/or surrounding the vehicle; and the emergency level determining unit determines the emergency level based on the state that is sensed by the sensing unit.

8. The vehicle remote assistance system according to claim 6, wherein:

the emergency level determining unit determines the emergency level based on an operation by a passenger of the vehicle.

9. The vehicle remote assistance system according to claim 5, wherein:

the calling unit transmits a reason for the call to the remote assistance apparatus, together with the call; and the emergency level determining unit is provided in the remote assistance apparatus and determines the emergency level based on the reason that is sent from a respective vehicle.

10. The vehicle remote assistance system according to claim 5, wherein:

the assigning unit selects a combination in which the minimum waiting period is shortest among the plurality of combinations in response to the emergency level determining unit determining that the emergency level is highest.

11. The vehicle remote assistance system according to claim 5, wherein:

the assigning unit selects a combination in which the maximum waiting period is shortest among the plurality of combinations in response to the emergency level determining unit determining that the emergency level is highest.

12. The vehicle remote assistance system according to claim 1, wherein:

the assigning unit assigns the call to the operator regardless of an occupancy rate of the plurality of operators in response to the waiting period exceeding the maximum waiting period.

13. The vehicle remote assistance system according to claim 1, wherein:

the assigning unit adjusts the minimum waiting period and/or the maximum waiting period based on an occupancy state of the plurality of operators.

14. A remote assistance apparatus that configures a vehicle remote assistance system together with a plurality of vehicles, the remote assistance apparatus comprising:

a receiving unit that receives calls that are transmitted from a calling unit provided in each of the plurality of vehicles; and an assigning unit that schedules the calls that are received by the receiving unit based on a priority level that becomes higher in accompaniment with a waiting period of the call, determines whether the calls satisfy a call condition, and assigning the calls to an operator of a plurality of operators in response to determining that the calls satisfy the call condition, wherein:

the calling unit transmits a cancelation of the call to the remote assistance apparatus when a reason for the call is resolved after the call is made;

the assigning unit cancels scheduling of the call that corresponds to the cancelation that is transmitted from a respective vehicle of the plurality of vehicles;

the priority level becomes higher in order of: a case in which the waiting period is less than a minimum waiting period; a case in which the waiting period exceeds the minimum waiting period and falls below a maximum waiting period; and a case in which the waiting period exceeds the maximum waiting period; and in response to the waiting period being less than the minimum waiting period, the assigning unit determines that the call does not satisfy the call condition and does not assign the call to the operator.

15. A remote assistance method for assigning an operator of a plurality of operators to remotely support a plurality of vehicles, the remote assistance method comprising:

receiving calls that are transmitted from the plurality of vehicles;

scheduling the calls that are received based on a priority level that becomes higher in accompaniment with a waiting period of the call, determining whether the calls satisfy a call condition, and assigning the calls to any of the plurality of operators in response to determining that the calls satisfy the call condition;

receiving a cancelation of the call; and canceling scheduling of the call that corresponds to the cancelation based on reception of the cancelation, wherein:

the priority level becomes higher in order of: a case in which the waiting period is less than a minimum waiting period; a case in which the waiting period exceeds the minimum waiting period and falls below a maximum waiting period; and a case in which the waiting period exceeds the maximum waiting period; and in response to the waiting period being less than the minimum waiting period, it is determined that the call does not satisfy the call condition and the call is not assigned to the operator.

16. A non-transitory computer-readable storage medium storing therein a remote assistance program for assigning an operator of a plurality of operators to remotely assist a plurality of vehicles, the remote assistance program causing an information processing apparatus including a receiving unit to implement:

scheduling a call that is received from a vehicle of the plurality of vehicles by the receiving unit based on a priority level that becomes higher in accompaniment with a waiting period of the call, determining whether the calls satisfy a call condition, and assigning the call to any of the plurality of operators in response to determining that the calls satisfy the call condition; and canceling, based on a cancelation of the call that is received from the vehicle by the receiving unit, scheduling of the call that corresponds to the cancelation, wherein:

the priority level becomes higher in order of a case in which the waiting period is less than a minimum waiting period; a case in which the waiting period exceeds the minimum waiting period and falls below a maximum waiting period; and a case in which the waiting period exceeds the maximum waiting period; and in response to the waiting period being less than the minimum waiting period, it is determined that the call does not satisfy the call condition and the call is not assigned to the operator.

* * * * *